(12) United States Patent
Shaw et al.

(10) Patent No.: US 11,701,938 B2
(45) Date of Patent: Jul. 18, 2023

(54) OFF-ROAD VEHICLE SUSPENSION MONITORING AND ADJUSTMENT SYSTEM

(71) Applicants: Ronald D. Shaw, Costa Mesa, CA (US); David M. Byrd, Costa Mesa, CA (US); Cody Byrd, Costa Mesa, CA (US); Evan Shaw, Costa Mesa, CA (US)

(72) Inventors: Ronald D. Shaw, Costa Mesa, CA (US); David M. Byrd, Costa Mesa, CA (US); Cody Byrd, Costa Mesa, CA (US); Evan Shaw, Costa Mesa, CA (US)

( * ) Notice: Subject to any disclaimer, the term of this patent is extended or adjusted under 35 U.S.C. 154(b) by 99 days.

(21) Appl. No.: 17/177,934

(22) Filed: Feb. 17, 2021

(65) Prior Publication Data
US 2021/0162829 A1  Jun. 3, 2021

Related U.S. Application Data

(62) Division of application No. 15/847,219, filed on Dec. 19, 2017, now Pat. No. 10,933,709.

(51) Int. Cl.
*B60G 17/015* (2006.01)
*B60G 17/06* (2006.01)

(52) U.S. Cl.
CPC ........... *B60G 17/015* (2013.01); *B60G 17/06* (2013.01); *B60G 2300/12* (2013.01);
(Continued)

(58) Field of Classification Search
CPC .................................................. B60G 17/015
See application file for complete search history.

(56) References Cited

U.S. PATENT DOCUMENTS

| 2,799,158 A * | 7/1957 | Federspiel | G01M 17/045 |
| | | | 73/11.08 |
| 3,049,359 A * | 8/1962 | Geyer | B60G 17/021 |
| | | | 280/124.179 |

(Continued)

FOREIGN PATENT DOCUMENTS

| CN | 101439653 | | 5/2009 |
| CN | 101439653 A | * | 5/2009 |

(Continued)

OTHER PUBLICATIONS

European Patent Office, Supplementary European Search Report for Application No. EP 18 89 1937, dated Nov. 10, 2021, 9 pages.

(Continued)

*Primary Examiner* — Shelley Chen
(74) *Attorney, Agent, or Firm* — Stetina Brunda Garred and Brucker

(57) ABSTRACT

A suspension monitoring and adjustment system for an off-road vehicle includes a distance sensor arranged to measure shock displacement of a suspension of the vehicle. The system may include an output device configured to output shock displacement data generated by the distance sensor and a processor or programmable circuit operable to produce a visual representation of the shock displacement data output by the output device. The system may include a processor or programmable circuit operable to generate an adjustment signal based on shock displacement data generated by the distance sensor and a suspension adjuster arranged to adjust the suspension of the vehicle in response to the adjustment signal.

8 Claims, 5 Drawing Sheets

(52) U.S. Cl.
CPC .................. *B60G 2400/252* (2013.01); *B60G 2600/0422* (2013.01); *B60G 2600/70* (2013.01)

(56) References Cited

U.S. PATENT DOCUMENTS

| | | | | |
|---|---|---|---|---|
| 3,955,590 | A * | 5/1976 | Palm | G05D 16/107 |
| | | | | 137/116.5 |
| 4,128,152 | A * | 12/1978 | Tschursch | B60N 2/544 |
| | | | | 192/48.91 |
| 4,749,210 | A | 6/1988 | Sugasawa | |
| 5,116,016 | A * | 5/1992 | Nagata | B60N 2/505 |
| | | | | 248/564 |
| 5,243,525 | A * | 9/1993 | Tsutsumi | B60G 17/01941 |
| | | | | 701/37 |
| 5,301,974 | A * | 4/1994 | Knapp | B62K 25/30 |
| | | | | 267/221 |
| 5,927,679 | A * | 7/1999 | Hill | B60N 2/505 |
| | | | | 248/588 |
| 6,036,212 | A * | 3/2000 | Baldomero | B62K 25/08 |
| | | | | 280/277 |
| 9,278,598 | B2 * | 3/2016 | Galasso | B60G 17/018 |
| 9,649,904 | B2 * | 5/2017 | Yamamoto | B60G 11/27 |
| 9,926,035 | B2 * | 3/2018 | Pye | B60G 15/12 |
| 10,300,760 | B1 * | 5/2019 | Aikin | B60G 17/0195 |
| 10,731,724 | B2 * | 8/2020 | Laird | F16F 9/34 |
| 11,173,766 | B1 * | 11/2021 | Hall | B60G 17/0164 |
| 2005/0065680 | A1 * | 3/2005 | Kawauchi | G01M 15/00 |
| | | | | 701/37 |
| 2005/0077691 | A1 * | 4/2005 | Witters | B60G 11/27 |
| | | | | 280/5.514 |
| 2009/0200127 | A1 * | 8/2009 | Janes | F16F 9/44 |
| | | | | 188/314 |
| 2012/0068436 | A1 * | 3/2012 | Powell | F16F 9/56 |
| | | | | 280/283 |
| 2013/0118847 | A1 * | 5/2013 | Krahenbuhl | F16F 9/48 |
| | | | | 188/313 |
| 2016/0152107 | A1 * | 6/2016 | Ranjan | B60G 17/08 |
| | | | | 267/225 |
| 2017/0028872 | A1 * | 2/2017 | Fukudome | B60L 15/2036 |
| 2017/0227081 | A1 * | 8/2017 | Hsu | F16K 17/06 |
| 2018/0162482 | A1 * | 6/2018 | Pye | B60G 17/08 |

FOREIGN PATENT DOCUMENTS

| | | | |
|---|---|---|---|
| CN | 106904135 | | 6/2017 |
| CN | 106904135 A | * | 6/2017 |
| IN | 201721036701 A | * | 6/2018 |

OTHER PUBLICATIONS

Patent Cooperation Treaty, International Search Report and Written Opinion for International Application No. PCT/US2018/065783, dated Feb. 22, 2019, 11 pages.

* cited by examiner

OFF-ROAD VEHICLE SUSPENSION MONITORING AND ADJUSTMENT SYSTEM

CROSS-REFERENCE TO RELATED APPLICATIONS

The present application is a divisional of U.S. patent application Ser. No. 15/847,219, filed Dec. 19, 2017, the entire disclosure of which is expressly incorporated herein by reference.

STATEMENT RE: FEDERALLY SPONSORED RESEARCH/DEVELOPMENT

Not Applicable

BACKGROUND

Technical Field

The present disclosure relates generally to off-road vehicles, and more specifically to adjusting off-road vehicle suspensions.

DESCRIPTION OF THE RELATED ART

Off-road vehicles such as dirt bikes, mountain bikes, and ATVs have numerous adjustable suspension settings that affect the ride and performance of the vehicle. Because the effects of these settings are interrelated, it is often difficult for a rider to determine exactly which suspension setting to adjust when experiencing a problem with the vehicle. The difficulty is compounded by the fact that the appropriate suspension settings for a vehicle depend not just on the particular rider but on the particular terrain and even the particular course. As a result, many riders are intimidated by suspension settings and never try to adjust them. These riders miss out on the full potential of their vehicle. Even in the case of experienced riders who have put in the time to learn how to tune their suspensions, the process of adjusting suspension settings is conventionally a trial-and-error process requiring a great amount of experimentation.

Accordingly, there is a need in the art for systems and methods of adjusting off-road vehicle suspension settings that overcome the above drawbacks accompanying the related art. Various aspects of the present disclosure address these particular needs, as will be discussed in more detail below.

BRIEF SUMMARY

In accordance with one or more aspects of the present disclosure, there is provided a suspension monitoring and adjustment system for an off-road vehicle. A distance sensor is provided on the vehicle to measure shock displacement of the suspension while the vehicle traverses a course. Based on the accumulated shock displacement data, an external device may produce a graph of the shock displacement data (e.g. shock displacement as a function of time), providing the rider with the entire shock displacement history for the course. By observing various features of the graph (e.g. bottom-outs, repeated shock compressions resulting in packing, average/maximum displacement, etc.), the rider may then efficiently tune the suspension settings of the vehicle. Alternatively, or additionally, an on-vehicle processor may apply various rules and thresholds to automatically generate one or more suspension adjustment signals as the rider traverses the course. Actuators arranged to adjust the suspension settings may receive the suspension adjustment signal(s) and make appropriate suspension setting adjustments on the fly.

One aspect of the embodiments of the present disclosure is a suspension monitoring and adjustment system for an off-road vehicle. The system includes a distance sensor arranged to measure shock displacement of a suspension of the vehicle, an output device communicatively coupled to the distance sensor and configured to output shock displacement data generated by the distance sensor, and a non-transitory program storage medium on which are stored instructions. The instructions are executable by a processor or programmable circuit to produce a visual representation of the shock displacement data output by the output device.

The distance sensor may include a frame-side part disposed at a location on the vehicle that is stationary relative to a frame of the vehicle and a wheel-side part disposed in optical communication with the frame-side part at a location on the vehicle that is stationary relative to a wheel or a suspension linkage of the vehicle.

The non-transitory program storage medium may be included in a mobile device including a processor or programmable circuit for executing the instructions. The instructions may be executable by the processor or programmable circuit to display the visual representation of the shock displacement data on a display of the mobile device.

The visual representation of the shock displacement data may include a graph of shock displacement over time.

The output device may be communicatively coupled to a speedometer of the vehicle and configured to output speed data generated by the speedometer. The instructions may be executable by the processor or programmable circuit to further produce a visual representation of the speed data output by the output device.

The output device may include a data port and may be configured to output the shock displacement data to removable media or an external device via the data port.

The output device may include a wireless transmitter and may be configured to output the shock displacement data wirelessly via the wireless transmitter.

Another aspect of the embodiments of the present disclosure is a suspension monitoring and adjustment system for an off-road vehicle. The system includes a distance sensor arranged to measure shock displacement of a suspension of the vehicle, a non-transitory program storage medium on which are stored instructions, and a processor or programmable circuit communicatively coupled to the distance sensor and operable to receive shock displacement data generated by the distance sensor and perform the instructions stored on the non-transitory program storage medium. The instructions are executable by the processor or programmable circuit to generate an adjustment signal based on the shock displacement data generated by the distance sensor. The system further includes a suspension adjuster communicatively coupled to the processor or programmable circuit and arranged to adjust the suspension of the vehicle in response to the adjustment signal.

The distance sensor may include a frame-side part disposed at a location on the vehicle that is stationary relative to a frame of the vehicle and a wheel-side part disposed in optical communication with the frame-side part at a location on the vehicle that is stationary relative to a wheel or a suspension linkage of the vehicle.

The processor or programmable circuit may be communicatively coupled to a speedometer of the vehicle and operable to receive the speed data generated by the speedometer. The instructions may be executable by the processor or programmable circuit to generate the adjustment signal further based on the speed data.

The suspension adjuster may include a shock pump arranged to increase or decrease air pressure in a fork or shock of the suspension in response to the adjustment signal.

The suspension adjuster may include an actuator arranged to turn a compression adjuster or a rebound adjuster of the suspension in response to the adjustment signal.

Another aspect of the embodiments of the present disclosure is a method of monitoring and adjusting a suspension of an off-road vehicle. The method includes providing a distance sensor arranged to measure shock displacement of the suspension of the vehicle and adjusting the suspension of the vehicle based on shock displacement data generated by the distance sensor.

The method may include producing a visual representation of the shock displacement data generated by the distance sensor. The adjusting may include adjusting the suspension of the vehicle based on the visual representation. The method may include recording the shock displacement data generated by the distance sensor on removable media or an external device. The method may include wirelessly transmitting the shock displacement data generated by the distance sensor to a mobile device.

The method may include generating an adjustment signal based on the shock displacement data generated by the distance sensor. The adjusting may include adjusting the suspension of the vehicle in response to the adjustment signal. The adjusting may include increasing or decreasing air pressure in a fork or shock of the suspension or turning a displacement adjuster or a rebound adjuster of the suspension in response to the adjustment signal.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
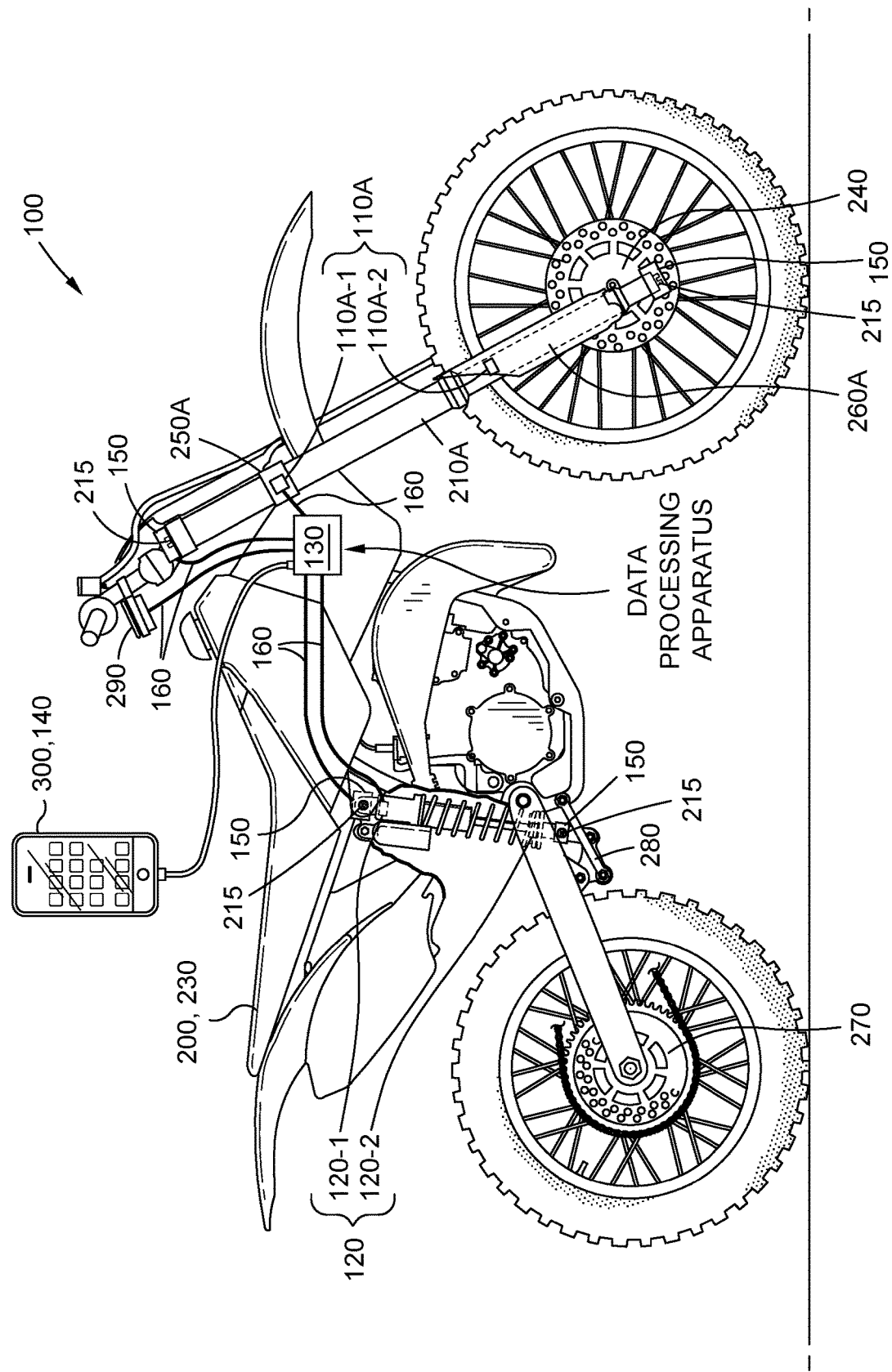
FIG. 1 shows a suspension monitoring and adjustment system according to an embodiment of the present disclosure, together with an off-road vehicle and a mobile device.

The detailed description set forth below in connection with the appended drawings is intended as a description of certain embodiments of a suspension monitoring and adjustment system for an off-road vehicle and method of monitoring and adjusting a suspension of an off-road vehicle. The described embodiments are not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure pertain to suspension monitoring and adjustment system specifically configured and adapted for use with an off-road vehicle having a suspension. Along these lines, it is understood that an off-road vehicle suspension may include, in the case of a two-wheeled vehicle, a pair of fork tubes (also referred to as forks) connected between the handlebars and the front wheel. Each of the fork tubes has a telescoping structure allowing for compression in the longitudinal direction according to the characteristics of an interior shock absorber or shock, which typically is hydraulic in the case of a dirt bike and pneumatic in the case of a mountain bike. Compressing the fork tubes (i.e. pushing down on the handlebars) decreases the distance between the frame of the vehicle and the front wheel. An off-road vehicle suspension may further include, again in the case of a two-wheeled vehicle, a rear shock connected between the body of the vehicle and the rear wheel or between the body of the vehicle and a suspension linkage that connects to a swingarm connected to the rear wheel. Compressing the rear shock (i.e. pushing down on the vehicle) decreases the distance between the frame of the vehicle and the rear wheel or suspension linkage. Off-road vehicles having more than two wheels (e.g. ATVs) may similarly include shocks whose compression decreases the distance between the frame of the vehicle and one or more wheels or suspension linkages.

As used herein, shock displacement may generally refer to the distance that a shock is compressed from a fully extended position, the distance that a shock is extended from a fully compressed position, the distance that a frame/wheel or frame/linkage system is compressed from a fully extended position due to the compression of an associated shock, or the distance that a frame/wheel or frame/linkage system is extended from a fully compressed position due to the extension of an associated shock. Depending on how shock displacement is measured (e.g. which points on the vehicle are used to measure the relevant distance), a maximum shock displacement may or may not equate to a shock stroke or suspension travel as customarily defined.

It is further understood that off-road vehicle suspension settings are adjustable by means of various manual adjusters (e.g. knobs rotatable by a flathead screwdriver) as well as in some cases by means of increasing or decreasing air pressure in a shock, for example, using a shock pump, the latter means more typical in the case of a mountain bike. Such suspension settings may include, for example, fork compression, fork rebound, rear shock compression, and rear shock rebound. Fork compression and fork rebound may be separately adjustable for each fork tube. Rear shock compression may include separately adjustable high-speed and low-speed compression adjusters. In accordance with the various embodiments of the innovations described herein, such suspension settings may be efficiently adjusted, either manually or automatically, based on shock displacement data generated by one or more distance sensors disposed on the vehicle.

Referring now to the drawings, FIG. 1 depicts an exemplary embodiment of a suspension monitoring and adjustment system 100 together with an off-road vehicle 200. The system 100 includes one or more distance sensors 110A, 120 and a data processing apparatus 130. A distance sensor 110A is arranged to measure shock displacement of a right fork tube 210A of the vehicle 200, while a distance sensor 120 is arranged to measure shock displacement of a rear shock 220 of the vehicle 200. An additional distance sensor 110B (not pictured) may be arranged to measure shock displacement of a left fork tube 210B (not pictured) of the vehicle 200. In this regard, the distance sensor 110B may be arranged similarly to the distance sensor 110A, except on the left side of the vehicle 200. The system may further include a non-transitory program storage medium 140. In the example shown in FIG. 1, the non-transitory program storage medium 140 is included in a mobile device 300, which includes a processor or programmable circuit for executing instructions (e.g. a mobile app) stored on the non-transitory program storage medium 140.

As shown in FIG. 1 by way of example, the distance sensor 110A may include a frame-side part 110A-1 disposed at a location on the vehicle 200 that is stationary relative to a frame 230 of the vehicle 200 and a wheel-side part 110A-2 disposed in optical communication with the frame-side part 110A-1 at a location on the vehicle 200 that is stationary relative to a front wheel 240 of the vehicle 200. In the example shown, the frame-side part 110A-1 of the distance sensor 110A is disposed on a clamp 250A that holds an upper portion of the right fork tube 210A, while the wheel-side part 110A-2 is disposed on a right fork guard 260A. Similarly, the distance sensor 110B may include a frame-side part 110B-1 disposed on a clamp 250B (not pictured) that holds an upper portion of the left fork tube 210B (not pictured), while the wheel-side part 110B-2 may be disposed on a left fork guard 260B (not pictured). Along the same lines, the distance sensor 120 may include a frame-side part 120-1 disposed at a location on the vehicle 200 that is stationary relative to a frame 230 of the vehicle 200 and a wheel-side part 120-2 disposed in optical communication with the frame-side part 120-1 at a location on the vehicle 200 that is stationary relative to a rear wheel 270 or a suspension linkage 280 of the vehicle 200. In the example shown, the frame-side part 120-1 of the distance sensor 120 is disposed near the top of the rear shock 220 where the rear shock 220 connects to the frame 230 of the vehicle 200, while the wheel-side part 120-2 of the distance sensor 120 is disposed near the bottom of the rear shock 220 where the rear shock 220 connects to the suspension linkage 280.

Each pair of distance sensor parts 110A-1 and 110A-2, 110B-1 and 110B-2, 120-1 and 120-2 may define an optical receiver (e.g. 110A-1) and an optical transmitter (e.g. 110A-2), with shock displacement being measured on the basis of detected intensity or power of light (e.g. infrared) transmitted by the optical transmitter and received by the optical receiver. Other known optical distance measurement techniques, such as interferometry, are also contemplated. In some cases, distance sensors 110A, 110B, and 120 may include only a single part (e.g. 110A-1, 110B-1, 120-1) including both an optical transmitter and an optical receiver. For example, optical distance measurement of shock displacement may be achieved by known triangulation techniques in which a beam of light (e.g. a laser) is transmitted by a transmitter, undergoes diffuse reflection at an opposing surface (e.g. right fork guard 260A, left fork guard 260B, suspension linkage 280), and is received by a receiver laterally offset from the transmitter. In this way, shock displacement can be measured on the basis of the angle of reception by the receiver. One benefit of this technique in the context of off-road riding is that the critical optics can be confined to the upper part of the shock where they are less likely to become caked in mud and ineffective. Diffuse reflection at the lower part of the shock will still occur even if mud covers the designated surface, with only minimally reduced measurement accuracy. As another example, a single part (e.g. 110A-1, 110B-1, 120-1) of a distance sensor 110A, 110B, 120 may include an optical reader disposed on an outer telescoping portion of a fork tube 210A, 210B or rear shock 220 and arranged to observe a corresponding inner telescoping portion as the telescoping portions telescope relative to each other. A series of reference marks printed on the inner telescoping portion can be optically observed by the optical reader (e.g. 110A-1, 110B-1, 120-1) to determine shock displacement based on the relative positions of the telescoping portions.

Non-optical distance measurement techniques are also contemplated. For example, each pair of distance sensor parts 110A-1 and 110A-2, 110B-1 and 110B-2, 120-1 and 120-2 may define a pair of accelerometers (i.e. one in each part), with shock displacement being measured on the basis of a difference between the accelerometer data generated by the pair of accelerometers. Other contemplated distance measurement techniques for measuring shock displacement include ultrasonic, magnetic, inductive, and linear encoder means, any of which may be utilized by distance sensors 110A, 110B, 120.

In the example shown in FIG. 1, wires 160 are illustrated connecting the data processing apparatus 130 to the distance sensors 110A, 120, and it is understood that corresponding wires 160 may connect the data processing apparatus 130 to a distance sensor 110B (not shown) on the left side of the bike. Wires 160 may be conveniently secured to the vehicle 200 along the vehicle 200 (e.g. by clips) so as to be generally out of the way and unobtrusive. For example, wires 160 may run primarily along the frame 230 of the vehicle to the upper parts 110A-1, 110B-1, 120-1 of the distance sensors 110A, 110B, 120. In the case of wired connection to lower parts 110A-2, 110B-2, 120-2 and/or lower suspension adjusters 150 (described below) that are disposed on or near the wheels of the vehicle 200, wires 160 may additionally run longitudinally down the length of fork tubes 210A, 210B or rear shock 220, in which case the wire 160 may be secured above and below the shock with enough slack to accommodate the displacement of the shock. Such loosely disposed portion of a wire 160 may be provided with a hard case, cover, or shield to prevent it from coming into contact with an obstacle on the course or the rider's body. As an alternative, wireless transmission is contemplated, particularly for wheel-side (lower) sensor parts and/or suspension adjusters 150.

The data processing apparatus 130 may function as an output device communicatively coupled to the distance sensor(s) 110A, 110B, 120 and configured to output shock displacement data generated by the distance sensor(s) 110A, 110B, 120. In this regard, the data processing apparatus 130 may include, for example, a wireless transmitter or data port as described in more detail below. At the end of a ride, day, etc., a rider of the vehicle 200 may operate the data processing apparatus 130 (e.g. by pressing a "send" button to initiate a wireless transfer, by removing a flash drive or other removable medium, by plugging in a cable connected to an external device, etc.) to output the accumulated shock displacement data to an external device such as the mobile device 300. Alternatively, in the case of a wireless transmitter, the data processing apparatus 130 may output shock displacement data to the external device as it is generated, i.e. during the ride.

The non-transitory program storage medium 140 included in the mobile device 300 stores instructions to produce a visual representation of the shock displacement data output by the data processing apparatus 130. In this regard, as noted above, the mobile device 300 may include a processor or programmable circuit for executing the instructions stored on the non-transitory program storage medium 140. Upon receiving the shock displacement data output by the data processing apparatus 130, a processor or programmable circuit of the mobile device 300 may execute the instructions stored on the program storage medium 140 to produce a visual representation of the shock displacement data. The visual representation may include, for example, a graph of shock displacement over time. As a specific example, the visual representation may include separate line graphs corresponding to each shock (e.g. right fork tube 210A, left fork tube 210B, rear shock 220) vertically aligned to share a single time axis. By viewing the visual representation, the rider may easily make appropriate adjustments to the suspension of the vehicle 200 as described in more detail below.

The suspension monitoring and adjustment system 100 may further include one or more suspension adjusters 150. Depending on the mechanism by which suspension settings are adjusted on the vehicle 200, the suspension adjusters 150 may take various forms. In the case of a dirt bike such as the vehicle 200 shown in FIG. 1, suspension settings may typically be adjusted by means of compression and rebound adjusters 215 located on the tops and bottoms of the fork tubes 210A, 210B and rear shock 220. Such compression and rebound adjusters 215 typically include a rotatable knob or screw that can be turned by hand or by a flathead screwdriver or other tool. In the case of such compression and rebound adjusters 215, a suspension adjuster 150 may include an actuator arranged to turn a compression or rebound adjuster 215 in response to an adjustment signal (as described in more detail later). For example, adjacent to each such compression or rebound adjuster 215 may be a dedicated suspension adjuster 150 for that compression or rebound adjuster 215, coupled to the data processing apparatus 130 by wires 160 or a wireless connection. In other cases, as in some mountain bikes, suspension settings (e.g. compression settings) may be adjustable by increasing or decreasing air pressure using a shock pump. In such cases, the suspension adjuster 150 may include a shock pump arranged to increase or decrease air pressure in a fork or shock of the suspension in response to the adjustment signal.

In a case where the vehicle 200 includes a speedometer 290, the data processing apparatus 130 may further be communicatively coupled to the speedometer 290, e.g. wirelessly or via wires 160. Thus, the data processing apparatus may additionally output speed data generated by the speedometer, and the instructions stored on the program storage medium 140 may be executable by the processor or programmable circuit of the external device (e.g. the mobile device 300) to produce a visual representation of the speed data output by the output device. Alternatively, or additionally, the data processing apparatus 130 may generate the adjustment signal further based on the speed data.

Figure 2A:
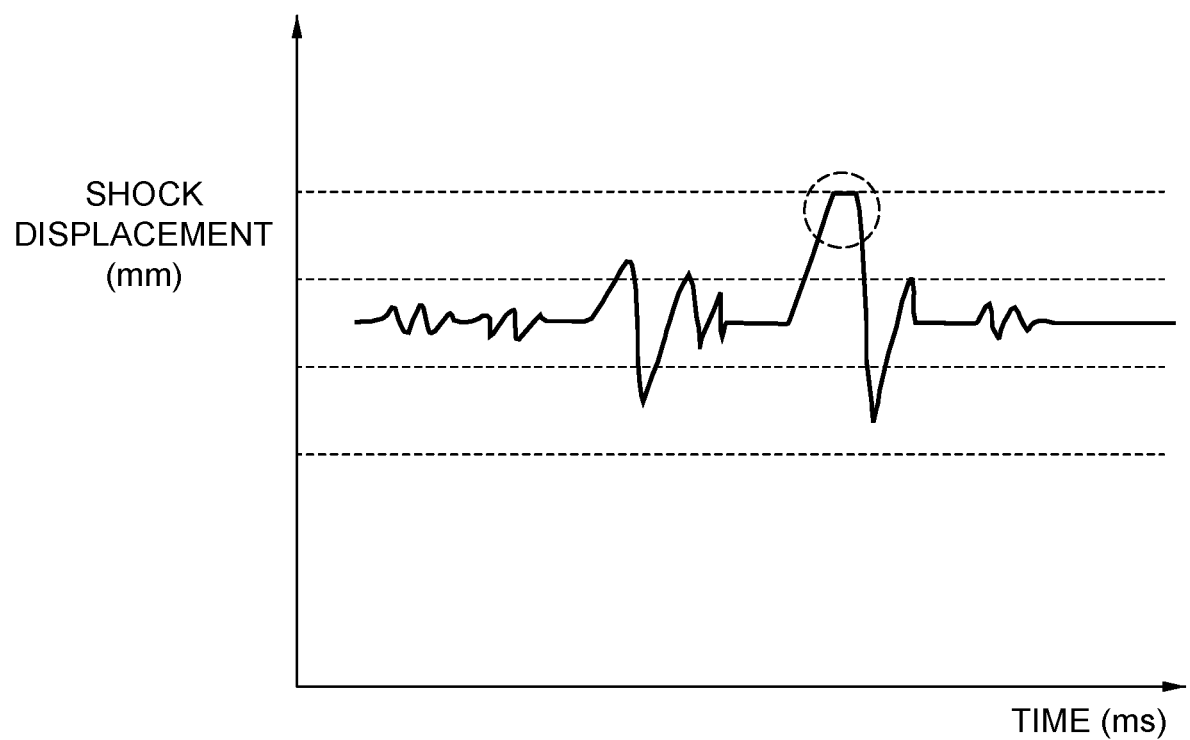
FIG. 2A is a graphical representation of an example of shock displacement data.

FIG. 2A is a graphical representation of an example of shock displacement data. The graphical representation shown in FIG. 2A may be an example of a visual representation (or a portion thereof) produced in accordance with instructions stored on the program storage medium 140 of an external device such as the mobile device 300. As the vehicle 200 traverses the course, a distance sensor 110A, 110B, 120 measures shock displacement of a corresponding shock and generates shock displacement data representing the shock displacement. As noted above, the exact placement of the distance sensor 110A, 110B, 120 determines the relationship between shock displacement and shock stroke or suspension travel as customarily defined. In this regard, the instructions to produce the visual representation may include instructions to appropriately convert the shock displacement data using conversion factors taking sensor placement and vehicle construction into account. In this way, the visual representation may present useful information about the ride and performance of the vehicle 200. Appropriately converted shock displacement data generated with respect to a rear shock 220 may represent, for example, the distance between the frame 230 and rear wheel 270 of the vehicle 200, after factoring in the relationship between the rear shock 220, rear wheel 270, suspension linkage 280, and swingarm.

In the example of FIG. 2A, displacement in millimeters (on the y-axis) is plotted versus time in seconds (on the x-axis), based on shock displacement data generated by a single distance sensor 110A, 110B, 120 with respect to a single shock. As noted above, similar graphs may be produced based on other sensors and presented in a vertically aligned manner. If separate graphs are produced for distance sensors 110A and 110B, a greater-than-expected difference between the two graphs may indicate that the suspension settings of the fork tubes 210A, 210B are not the same (as is typically desired). As can be seen in FIG. 2A, the displacement in millimeters increases and decreases as a function of time, due to the displacement of the shock as the vehicle 200 traverses the terrain of a course. The visual representation may further include various threshold markings as shown, which may be selected by a user of the mobile device 300 by means of a user interface generated in accordance with the stored instructions. For example, the stored instructions may be a mobile app including an appropriate settings menu for customizing the visual representation. In the example of FIG. 2A, maximum and minimum shock displacement thresholds are shown along with intermediate thresholds at specific displacement amounts in millimeters. By observing the relationship between the graph and the thresholds, the rider or other user of the mobile device 300 may observe, for example, that the shock bottomed out once (circled region of graph) and that an appropriate percentage of suspension travel was used based on the number of times the graph crossed the intermediate thresholds. For example, if it is desired to use at least 50% of suspension travel, the rider may set intermediate thresholds at levels of shock displacement representing 50% of suspension travel. The rider may then check whether the graph crossed the thresholds a minimum number of times (e.g. three) and conclude that an appropriate percentage of suspension travel was used. As a specific example, a rider may conclude that a compression setting of the shock does not need to be reduced because enough suspension travel was used, but that the compression setting should be slightly increased (e.g. one click of a compression adjuster) because of the single bottom-out.

Figure 2B:
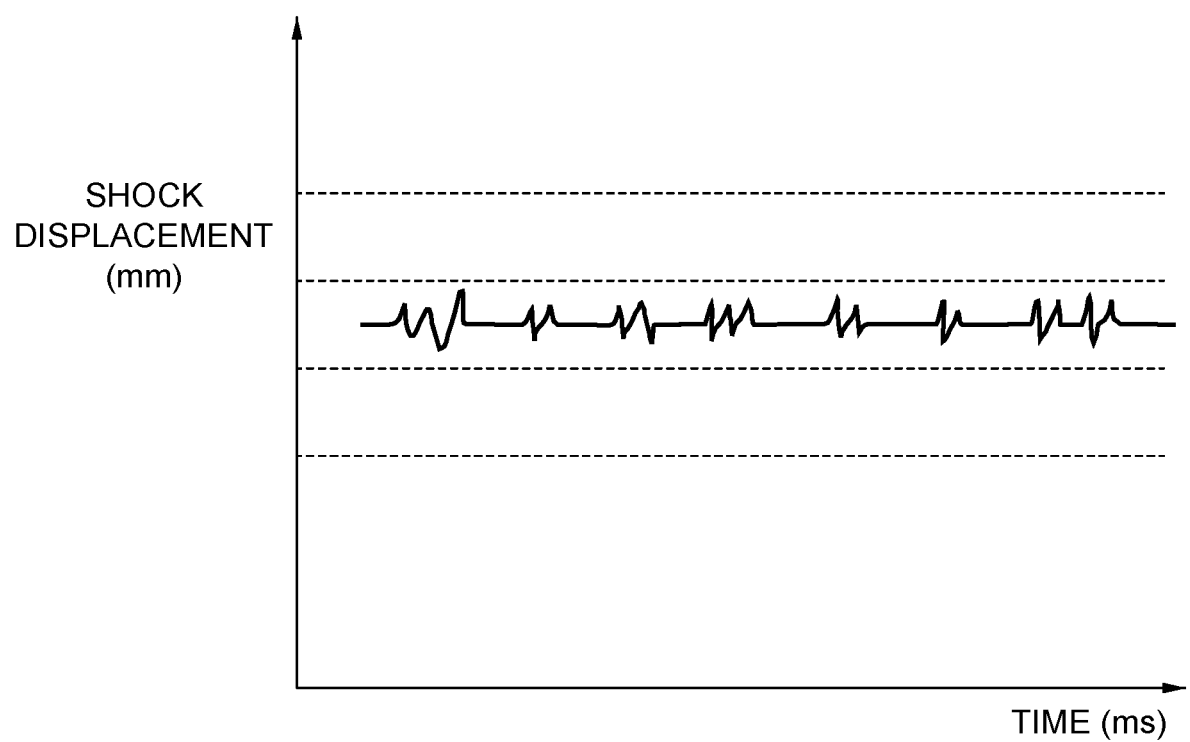
FIG. 2B is a graphical representation of another example of shock displacement data.

FIG. 2B is a graphical representation of another example of shock displacement data. In the example of FIG. 2B, intermediate thresholds have been set as in FIG. 2A. However, in the example of FIG. 2B, the graph never crosses the intermediate thresholds. On the basis of the graph of FIG. 2B, a rider may conclude that a compression setting of the shock needs to be reduced in order to allow the vehicle 200 to use more of the suspension travel. The rider may adjust the compression setting accordingly.

Figure 2C:
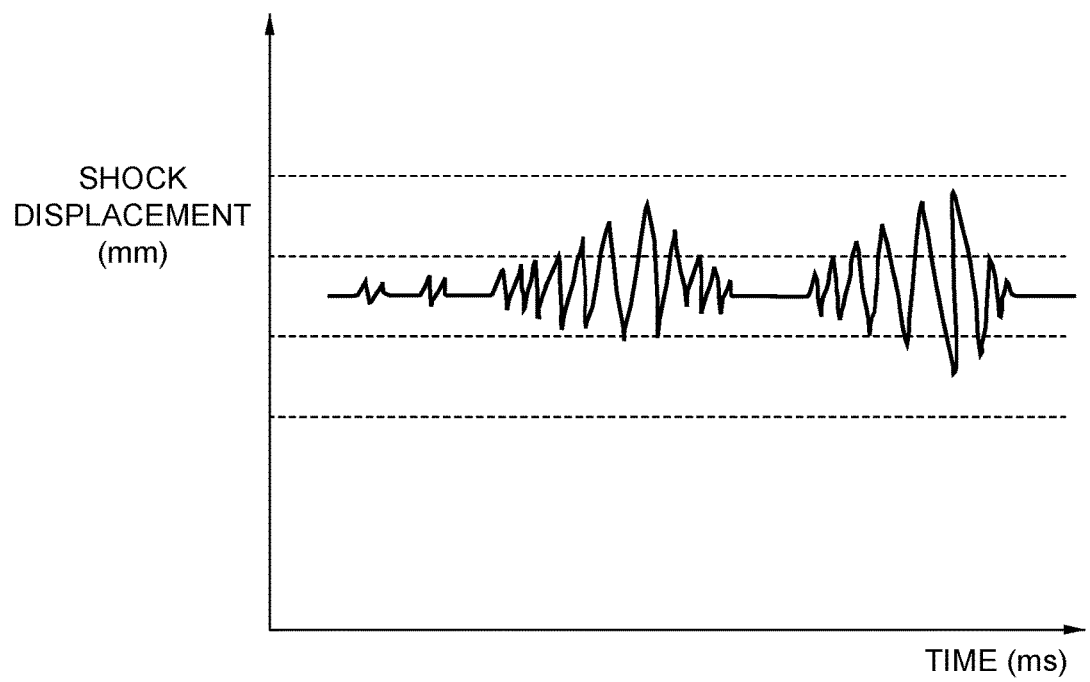
FIG. 2C is a graphical representation of another example of shock displacement data.

FIG. 2C is a graphical representation of another example of shock displacement data. In the example of FIG. 2C, at two points in the graph, repeated compressions of the shock result in rapidly increasing shock displacement. On the basis of the graph of FIG. 2C, a rider may conclude that the suspension of the vehicle 200 is packing due to insufficient rebound speed. To address this issue, the rider may adjust the rebound setting of the shock in order to allow the shock to rebound more quickly. If the rider is familiar with the course (e.g. if the rider just finished the course and is viewing the graph), it may be especially easy for the rider to diagnose the issue as the rider might recognize (by looking at the x-axis) that the repeated compressions correspond to a sequence of bumps on the course.

The above represents only a few specific examples of the information observable from a visual representation of the shock displacement data. The visual representation might further show, for example, an average ride height (sag) of the vehicle 200 while underway as well as speed of compression and rebound (e.g. the slope of the distance vs. time graph). In some cases, the visual representation may inform the rider that a replacement part is needed (e.g. in the case of an inappropriate sag indicating the need for a larger spring). In a case where the output shock displacement data is accompanied by output speed data generated by a speedometer 290 of the vehicle 200, the speed data may be included in the visual representation, e.g. displayed as an additional line graph on the same time axis indicating the vehicle speed corresponding to each data point of shock dispalcement. The speed data may further inform the rider as to what suspension adjustments should be made. For example, a reduced compression setting (a softer setting) may be appropriate when the vehicle 200 is moving at a lower speed. The visual representation may highlight, expand, zoom, drill down, or otherwise graphically or numerically present any such relevant information and/or suggested diagnoses and remedial measures according to preferences, settings, and selections of a user.

Figure 3:
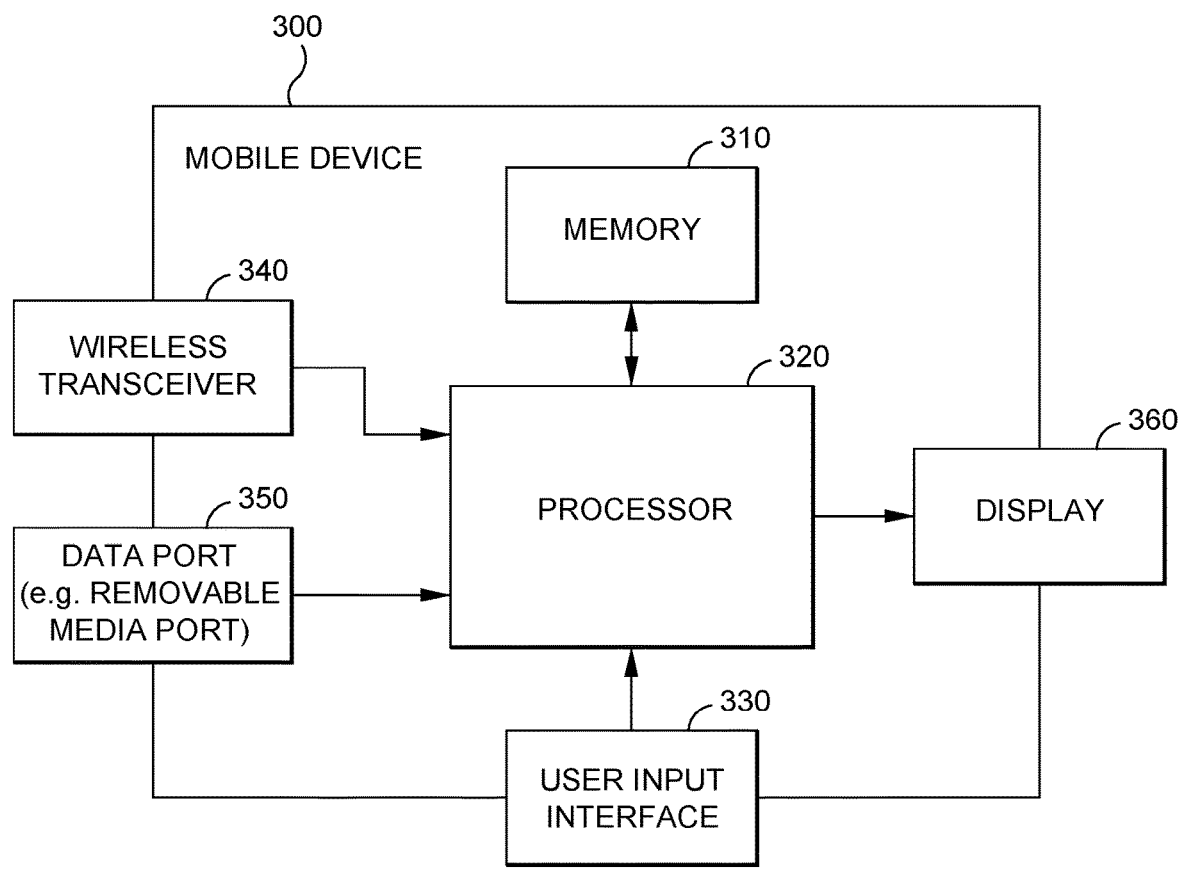
FIG. 3 is a schematic depiction of a mobile device including a program storage medium of the suspension monitoring and adjustment system.

FIG. 3 is a schematic depiction of a mobile device 300 including a memory 310, which is an example of the non-transitory program storage medium 140 of the suspension monitoring and adjustment system 100 shown in FIG. 1. The mobile device 300 may function as an external device that receives shock displacement data output by the data processing apparatus 130 and produces a visual representation thereof. The mobile device 300 may be, for example, a smartphone, tablet, or laptop computer, with the instructions stored in the memory 310 being a mobile app or other software program. The exemplary mobile device 300 shown in FIG. 3 is schematically depicted as including, in addition to the memory 310, a processor 320 for executing the instructions (e.g. mobile app) stored on the memory 310, a user input interface 330 for navigating the app (e.g. navigating a settings menu to customize the visual representation of the shock displacement data), a wireless transceiver 340 for receiving shock displacement data and optionally speed data transmitted by a wireless transmitter of the data processing apparatus 130 (e.g. via Bluetooth™, Wi-Fi, GSM, UMTS), a data port 350 for receiving shock displacement data and optionally speed data transferred by removable media (e.g. USB flash drive) or a direct data line (e.g. USB cable), and a display 360 for displaying the visual representation and other aspects of the app (settings menu, etc.). Depending on the particular output device of the data processing apparatus 130, only one of the wireless transceiver 340 and the data port 350 may be used in connection with the functionality of the suspension monitoring and adjustment system 100, with the other being omitted.

Figure 4:
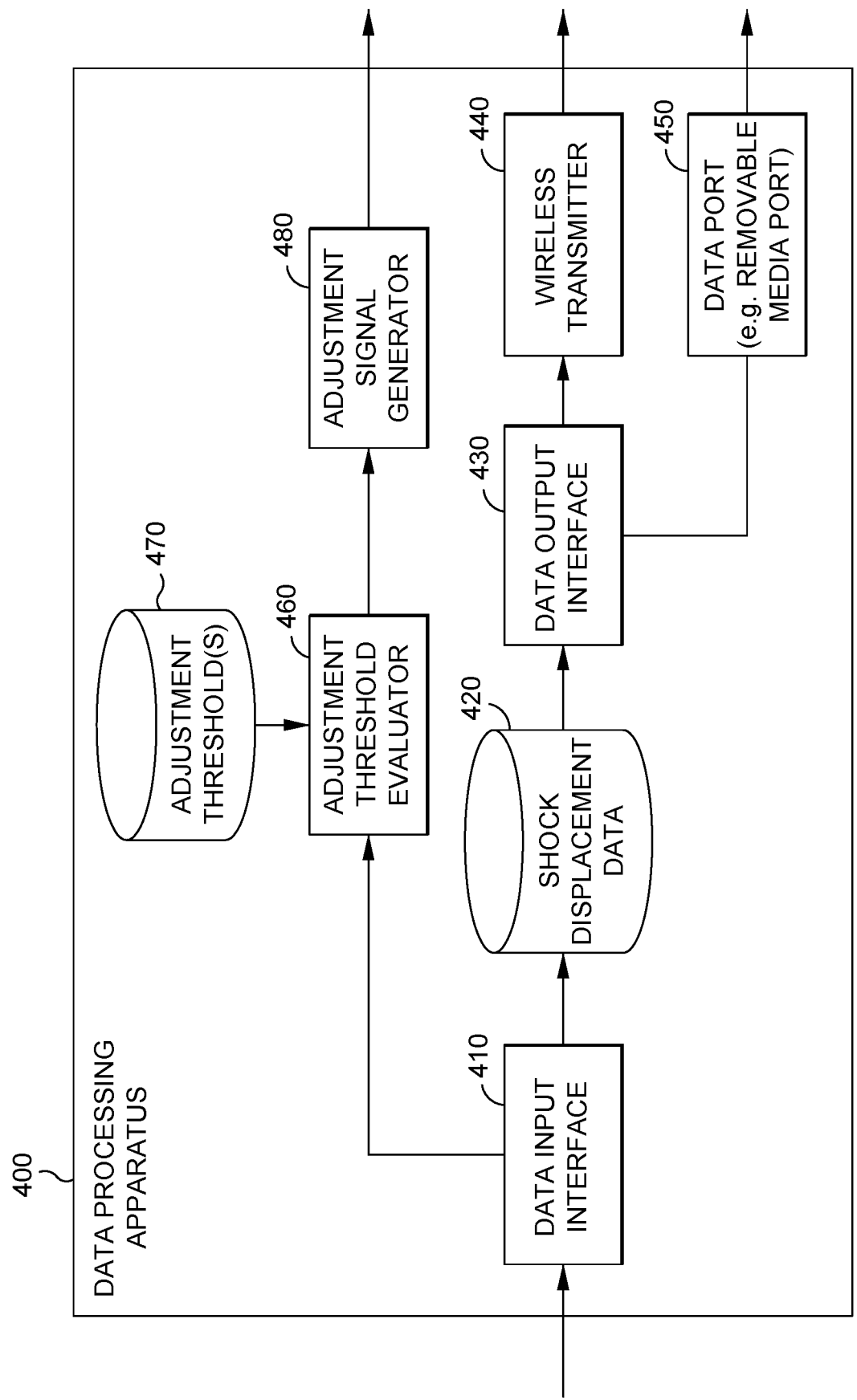
FIG. 4 is a schematic depiction of a data processing apparatus including one or more features of the suspension monitoring and adjustment system.

FIG. 4 is a schematic diagram of a data processing apparatus 400, which may be an example of the data processing apparatus 130 shown in FIG. 1. The data processing apparatus 400 receives shock displacement data generated by one or more distance sensors 110A, 110B, 120 arranged on the vehicle 200 and outputs the shock displacement data for use by an external device in producing a visual display. Based on the visual display, a rider can make appropriate adjustments to the suspension of the vehicle 200. Alternatively, or additionally, the data processing apparatus 400 receives the shock displacement data, compares the shock displacement data to one or more thresholds, and generates an adjustment signal used by a suspension adjuster 150 to adjust the suspension of the vehicle 200 on the fly. The data processing apparatus 400 includes a data input interface 410, a shock displacement data storage 420, a data output interface 430, a wireless transmitter 440, a data port 450, an adjustment threshold evaluator 460, an adjustment threshold storage 470, and an adjustment signal generator 480.

The data input interface 410 receives shock displacement data generated by one or more distance sensors 110A, 110B, 110C arranged to measure shock displacement of a suspension of the vehicle 200. For example, the data input interface 410 may receive shock displacement data of a right fork tube 210A, a left fork tube 210B, and/or a rear shock 220 generated by a distance sensor 110A, a distance sensor 110B, and/or a distance sensor 120, respectively. The shock displacement data may be a representation of shock displacement as a function of time and may be in the form of, for example, displacement in millimeters versus time in seconds. Thus, in a case where the distance sensor(s) 110A, 110B, 120 generate shock displacement data with a sampling frequency of 20 Hz, the shock displacement data may include a series of shock displacement samples at 50 millisecond intervals. The data input interface 410 may receive the shock displacement data from the distance sensor(s) 110A, 110B, 120 by wired or wireless connection. In this regard, the data input interface 410 may include one or more data ports for connection of the wires 160 and/or a wireless receiver.

Upon receiving the shock displacement data, the data input interface 410 may store the received shock displacement data in the shock displacement data storage 420. For example, the data input interface 410 may receive the shock displacement data in real time as it is generated by the distance sensor(s) 110A, 110B, 120 and record the data in the shock displacement data 420 in an accumulating manner such that the shock displacement data storage 420 stores all of the shock displacement data generated over an extended period of time, e.g. one hour, one race or course, one run of the vehicle 200 from engine on to engine off, etc.

The data output interface 430 outputs the accumulated shock displacement data stored in the shock displacement data storage 420. For example, upon the completion of a relevant period of time or event (e.g. engine off), and/or in response to an output command initiated by the rider (e.g. pressing a "send" button on the exterior of the data processing apparatus 130, inserting a USB flash drive into the data processing apparatus 130, plugging a USB cable into the data processing apparatus 130), the data output interface 430 may obtain the stored shock displacement data from the shock displacement data storage 420 and output the shock displacement data, e.g. to an external device such as the mobile device 300. More specifically, the data output interface 430 may output the shock displacement data via the wireless transmitter 440 (e.g. via Bluetooth™, Wi-Fi, GSM, UMTS) or via the data port 450 to a removable medium such as an inserted USB flash drive or directly to the external device by a USB cable or other data line. In this way, the data processing apparatus 130, 400 may function as an output device communicatively coupled to one or more distance sensors 110A, 110B, 120 and configured to output shock displacement data generated by the distance sensor(s) 110A, 110B, 120. An external device such as the mobile device 300 may receive the output shock displacement data and generate a visual representation thereof, which the rider may refer to when making suspension adjustments as described above in relation to FIGS. 2A-2C and 3.

As noted above, the data processing apparatus 400 may alternatively or additionally support automatic adjustment of the suspension of the vehicle 200 during the ride. In this regard, the adjustment threshold evaluator 460 of the data processing apparatus 400 may compare the shock displacement data generated by the distance sensor(s) 110A, 110B, 120 to one or more thresholds stored in the adjustment threshold storage 470 according to one or more rules and issue a command to the adjustment signal generator 480 accordingly. Many different rules and thresholds are possible, and the present disclosure is not intended to be limited in this regard. As a simple example, the adjustment threshold evaluator 460 may receive each data point (e.g. displacement in millimeters or ordered pair of displacement as a function of time) from the data input interface 410 one by one and compare it to a threshold representing a bottoming out of the shock (e.g. 95% or 100% of shock stroke or suspension travel). If any single data point exceeds (or reaches) the threshold, the adjustment threshold evaluator 460 may evaluate that an increase in a compression setting of the shock is necessary (e.g. one click of a compression adjuster) and issue a command to the adjustment signal generator 480 accordingly.

As a more complicated example, the adjustment threshold evaluator 460 may buffer a plurality of data points from the data input interface 410 and maintain a moving average or an average for the entire run. The adjustment threshold evaluator 460 may then continually compare the buffered data set to a plurality of thresholds stored in the adjustment threshold storage 470 as each new data point comes in or after every predetermined number of data points. In this way, the adjustment threshold evaluator 460 may implement any of the rules described in relation to FIGS. 2A-2C, such as checking whether an intermediate threshold has been crossed a minimum number of times relative to the total amount of time represented by the data or checking whether a series of compressions in a given time window exhibit increasing displacement characteristic of suspension packing. The adjustment threshold evaluator 460 can then evaluate whether an appropriate percentage of suspension travel is being used, whether a rebound setting is appropriate, etc. on the fly and issue a command to the adjustment signal generator 480 accordingly.

Upon receiving a command from the adjustment threshold evaluator 460, the adjustment signal generator 480 issues an adjustment signal to one or more of the suspension adjuster(s) 150 by wired or wireless connection. In this regard, the adjustment signal generator 480 may include one or more data ports for connection of the wires 160 and/or a wireless transmitter (or may transmit the adjustment signal via the wireless transmitter 440). The suspension adjuster(s) 150 may adjust the suspension of the vehicle 200 in response to the adjustment signal.

As noted above, the data processing apparatus 130 may further be communicatively coupled to a speedometer 290 of the vehicle 200. In such case, the data input interface 410 may additionally receive speed data from the speedometer 290 and store the speed data as part of the shock displacement data (in corresponding fashion, e.g. as an ordered triplet specifying shock displacement, time, and vehicle speed) and the data output interface 430 may further output the speed data via the wireless transmitter 440 or removable media port 450. Similarly, the adjustment threshold evaluator 460 may further evaluate the shock displacement data in relation to the corresponding speed data or average speed of the vehicle 200, issuing a command to the adjustment signal generator 480 accordingly. In this way, the data processing apparatus 400 may take into account the speed of the vehicle 200 when evaluating whether and which suspension adjustments are appropriate.

The various components of the data processing apparatus 400 (interfaces, storages, etc.) may be wholly or partly embodied in an on-board computer including one or more processors and one or more memories and/or programmable circuitry such as a field-programmable gate array (FPGA) or programmable logic array (PLA). In this regard, the data processing apparatus 130 may be regarded as including a non-transitory program storage medium on which are stored instructions executable by a processor or programmable circuitry to generate an adjustment signal based on shock displacement data generated by the distance sensor(s) 110A, 110B, 120, as well as a processor or programmable circuit communicatively coupled to the distance sensor(s) 110A, 110B, 120 and operable to receive the shock displacement data generated by the distance sensor(s) 110A, 110B, 120 and perform the instructions stored on the non-transitory program storage medium. For example, the adjustment threshold evaluator 460 may be an example of such a program storage medium with coupled processor or programmable circuit. The instructions stored on the program storage medium may include code executable by a processor or state information for execution by programmable circuitry.

As noted above, the structure and functionality described with respect to the data processing apparatus 400 may reside in the data processing apparatus 130 of FIG. 1. More specifically, all or a portion of the data processing apparatus 400 may be included in the data processing apparatus 130. For example, in a case where automatic suspension adjustment is not supported, the adjustment threshold evaluator 460, adjustment threshold storage 470, and adjustment signal generator 480 can be omitted. As another example, in a case where visual representation on an external device is not supported, the shock displacement data storage 420, data output interface 430, wireless transmitter 440, and data port 450 can be omitted.

Figure 5:
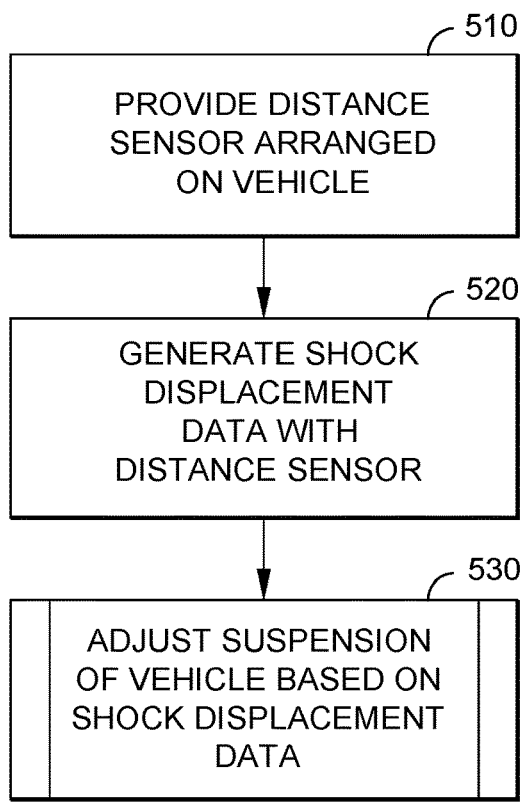
FIG. 5 shows an example operational flow in relation to a suspension monitoring and adjustment system according to an embodiment of the present disclosure.

FIG. 5 shows an example operational flow in relation to a suspension monitoring and adjustment system 100 according to an embodiment of the present disclosure. First, one or more distance sensors 110A, 110B, 120 arranged to measure shock displacement of the suspension of the vehicle 200 are provided (step 510). Providing the distance sensor(s) 110A, 110B, 120 may include, for example, installing the sensors on the vehicle 200 or providing the vehicle 200 with pre-installed sensors, and/or arranging or calibrating each of the sensor(s) to measure shock displacement of a given part of the suspension (e.g. right fork tube 210A, left fork tube 210B, rear shock 220). In addition to the distance sensor(s) 110A, 110B, 120, a data processing apparatus 130, one or more suspension adjusters 150, and/or providing wires 160 may be provided on the vehicle 200. A program storage medium 140 storing instructions as described above may further be provided, e.g. by downloading a mobile app to a mobile device 300. With the distance sensor(s) 110A, 110B, 120 and/or other components provided, shock displacement data is generated with the distance sensor(s) 110A, 110B, 120 (step 520). The generated shock displacement data may be received by the data processing apparatus 130, e.g. via wires 160. Lastly, the suspension of the vehicle 200 is adjusted based on the shock displacement data generated by the distance sensor(s) 110A, 110B, 120 (step 530).

Figure 6:
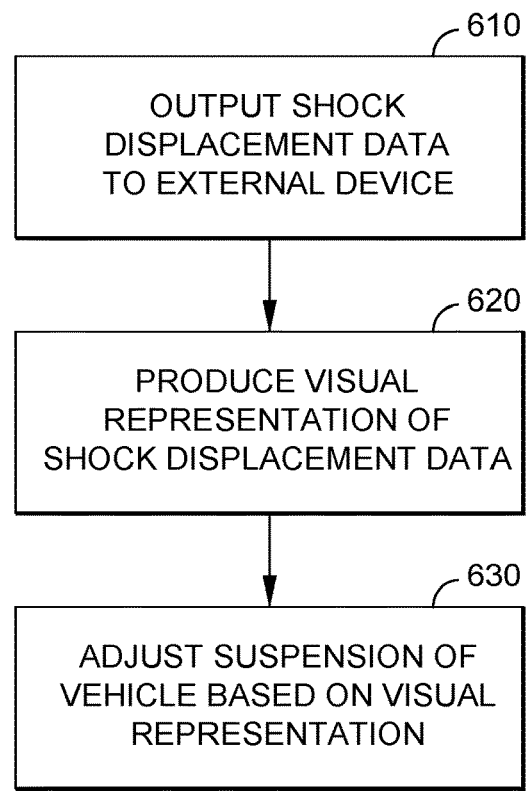
FIG. 6 shows an example operational flow of step 530 in FIG. 5.

FIG. 6 shows an example operational flow of step 530 in FIG. 5. The shock displacement data generated by the distance sensor(s) 110A, 110B, 120 may be output to an external device (step 610). For example, as described above in relation to the exemplary data processing apparatus 400, the data processing apparatus 130 may accumulate the generated shock displacement data and record the accumulated shock displacement data on removable media or wirelessly transmit (or transmit using a cable) the accumulated shock displacement data to an external device such as the mobile device 300. An external device such as the mobile device 300 described above in relation to FIG. 3 may thus receive the output shock displacement data via the removable media or wired or wireless transmission. Having received the shock displacement data, an external device such as the mobile device 300 may produce a visual representation of the shock displacement data (step 620). The visual representation may include, for example, a graph of shock displacement over time as described in relation to FIGS. 2A-2C. The rider may adjust the suspension of the vehicle 200 based on the visual representation (step 630).

Figure 7:
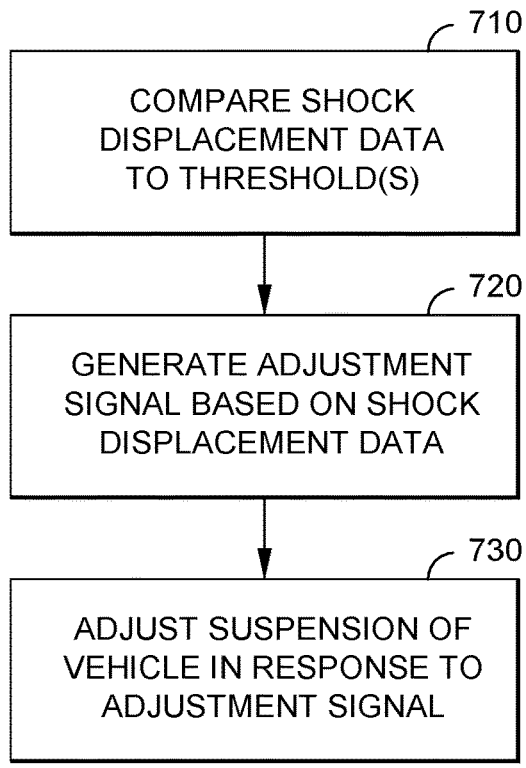
FIG. 7 shows another example operational flow of step 530 in FIG. 5.

FIG. 7 shows another example operational flow of step 530 in FIG. 5. The shock displacement data generated by the distance sensor(s) 110A, 110B, 120 may be compared to one or more thresholds (step 710). For example, as described above in relation to the exemplary data processing apparatus 400, the data processing apparatus 130 may apply various rules and thresholds to evaluate whether any of the suspension settings of the vehicle 200 should be adjusted on the fly. If it is evaluated that one or more suspension settings should be adjusted, the data processing apparatus 130 may generate an adjustment signal accordingly (step 720), which may be transmitted by wired or wireless connection to one or more suspension adjusters 150 on the vehicle 200. The suspension adjusters 150 may adjust the suspension of the vehicle in response to the adjustment signal (step 730), e.g. by increasing or decreasing air pressure in a fork or shock or turning a compression adjuster or a rebound adjuster in response to the adjustment signal.

While the vehicle 200 has been illustrated as a two-wheeled vehicle by way of example, including right and left fork tubes 210A, 210B and a rear shock 220, the disclosed embodiments are not intended to be so limited. Other off-road vehicles, including four-wheeled vehicles, are also contemplated, in which case the various compression, rebound, and other suspension setting adjusters may be located in different places and/or adjustable by different means than the specific examples described. Such embodiments and modifications are intended to be included in the scope of this disclosure. Furthermore, the various wireless transmitters and receivers described herein are not intended to be limited to devices with exclusive transmission or reception functionality and may also refer to transceivers.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A suspension monitoring and adjustment system for an off-road vehicle, the system comprising:
   a distance sensor arranged to measure shock displacement of a suspension of the vehicle, the distance sensor including a frame-side accelerometer disposed at a location on the vehicle that is stationary relative to a frame of the vehicle and a wheel-side accelerometer disposed at a location on the vehicle that is stationary relative to a wheel or a suspension linkage of the vehicle, the shock displacement being measured based on a difference between accelerometer data generated by the frame-side and wheel-side accelerometers;
   a non-transitory program storage medium on which are stored instructions executable by a processor or programmable circuit to generate an adjustment signal based on shock displacement data generated by the distance sensor;
   a processor or programmable circuit communicatively coupled to the distance sensor and operable to receive the shock displacement data generated by the distance sensor and perform the instructions stored on the non-transitory program storage medium; and
   a suspension adjuster communicatively coupled to the processor or programmable circuit and arranged to adjust the suspension of the vehicle in response to the adjustment signal, wherein the suspension adjuster includes an actuator arranged to turn a compression adjuster or a rebound adjuster of the suspension in response to the adjustment signal.

2. The system of claim 1, wherein the distance sensor includes a frame-side part disposed at a location on the vehicle that is stationary relative to the frame of the vehicle and a wheel-side part disposed in optical communication with the frame-side part at a location on the vehicle that is stationary relative to the wheel or the suspension linkage of the vehicle.

3. The system of claim 1, wherein
   the processor or programmable circuit is communicatively coupled to a speedometer of the vehicle and operable to receive the speed data generated by the speedometer, and
   the instructions are executable by the processor or programmable circuit to generate the adjustment signal further based on the speed data.

4. The system of claim 3, wherein the actuator is arranged to turn a compression adjuster of the suspension in response to the adjustment signal.

5. The system of claim 4, wherein the compression adjuster includes a rotatable knob or screw that is rotatable manually, and the actuator is arranged to turn the rotatable knob or screw.

6. The system of claim 3, wherein the actuator is arranged to turn a rebound adjuster of the suspension in response to the adjustment signal.

7. The system of claim 6, wherein the rebound adjuster includes a rotatable knob or screw that is rotatable manually, and the actuator is arranged to turn the rotatable knob or screw.

8. The system of claim 3, wherein the suspension adjuster is one of a plurality of suspension adjusters communicatively coupled to the processor or programmable circuit, each of the plurality of suspension adjusters including a respective actuator arranged to turn a corresponding compression or rebounder adjuster.

\* \* \* \* \*